United States Patent
Zeng

(10) Patent No.: US 9,134,852 B2
(45) Date of Patent: Sep. 15, 2015

(54) STATIC ELIMINATION METHOD FOR A TOUCH SCREEN

(71) Applicant: GUANG DONG OPPO MOBILE TELECOMMUNICATIONS CORP., LTD., Guangdong (CN)

(72) Inventor: Yuanqing Zeng, Guangdong (CN)

( * ) Notice: Subject to any disclaimer, the term of this patent is extended or adjusted under 35 U.S.C. 154(b) by 0 days.

(21) Appl. No.: 13/979,646

(22) PCT Filed: Sep. 29, 2012

(86) PCT No.: PCT/CN2012/082498
§ 371 (c)(1),
(2) Date: Jul. 16, 2013

(87) PCT Pub. No.: WO2013/123775
PCT Pub. Date: Aug. 29, 2013

(65) Prior Publication Data
US 2014/0240292 A1 Aug. 28, 2014

(30) Foreign Application Priority Data

Feb. 22, 2012 (CN) .......................... 2012 1 0040213
May 7, 2012 (CN) .......................... 2012 1 0139668

(51) Int. Cl.
G06F 3/042 (2006.01)
G06F 3/041 (2006.01)
G06F 3/01 (2006.01)

(52) U.S. Cl.
CPC ........ *G06F 3/042* (2013.01); *G06F 3/01* (2013.01); *G06F 3/0416* (2013.01)

(58) Field of Classification Search
None
See application file for complete search history.

(56) References Cited

U.S. PATENT DOCUMENTS

2012/0157073 A1* 6/2012 Kim et al. ............... 455/418
2012/0249433 A1* 10/2012 Deng et al. ............. 345/173

\* cited by examiner

*Primary Examiner* — Kenneth B Lee, Jr.
(74) *Attorney, Agent, or Firm* — Prakash Nama; Global IP Services, PLLC

(57) ABSTRACT

The present invention relates to A static eliminating method for a touch screen comprising: detecting if the touch screen departs from an object by using said photo sensor, and counting the number of communication failures between the touch screen and a control chip or detecting if the touch screen of a hand-held device is switched from the state of facing down into the state of facing up by using a gravity sensor, counting the number of failures of communication between the touch screen and the control chip; executing the reset operation of turning off and then turning on if the number of failures exceeds a communication failure set value; or executing the reset operation of resetting the register software of the touch screen/turning off and then turning on touch screen if the number of failures is smaller than a communication failure set value and the number of touch events in the same area of the touch screen in a set time exceeds a false report set value. (executing the reset operation of resetting the register software of the touch screen in a preferable embodiment) By using this method, the touch screen can be quickly reset to recover normal service if the touch screen is affected by static.

11 Claims, 2 Drawing Sheets

STATIC ELIMINATION METHOD FOR A TOUCH SCREEN

BACKGROUND OF THE INVENTION

The present invention relates to a touch screen, in particular to a static eliminating method for a touch screen.

As the capacitive touch screen itself is adapted to the changing of the environment, the datum value of the touch screen will change correspondingly to be adapted to the current touch environment. In the abnormal circumstance of static impact, the problems are usually found at parts of the touch screen software weak in resistance to static impact. For example, touch information is infinitely reported to the application layer as if a finger always presses an area, which causes no response to normal finger touch. This is the non-function phenomenon occurring on the touch screen. In addition, due to static impact, the I2C communication time sequence of the touch screen malfunctions. I2C communication failure also can cause non-function of the touch screen.

BRIEF SUMMARY OF THE INVENTION

The technical problem to be solved in the present invention is to provide a static eliminating method for a touch screen, which allows the touch screen to quickly reset to recover normal service on condition of static impact.

The present invention solves the technical problem in the following way: A static eliminating method for a touch screen, with use of a photo sensor or a gravity sensor matched with a touch screen, is provided, comprising the following steps in turn:

A, detecting if the touch screen departs from an object by using said photo sensor, and counting the number of communication failures between the touch screen and a control chip, or detecting if the touch screen of a hand-held device is switched from the state of facing down into the state of facing up by using a gravity sensor, counting the number of failures of communication between the touch screen and the control chip;

B, executing the reset operation of turning off and then turning on if the number of failures exceeds a communication failure set value; or executing the reset operation of resetting the register software of the touch screen/turning off and then turning on the touch screen if the number of failures is smaller than a communication failure set value and the number of touch events in the same area of the touch screen in a set time exceeds a false report set value. In a preferable embodiment, if the number of failures is smaller than a communication failure set value and the number of touch events in the same area exceeds a false report set value, the operation is resetting the register software of the touch screen is executed.

According to the static eliminating method for a touch screen provided by the present invention, said area can be defined as the area of the touch screen weak in resistance to static impact.

According to the static eliminating method for a touch screen provided by the present invention, said photo sensor is located below the touch screen, and the touch screen can transmit light.

According to the static eliminating method for a touch screen provided by the present invention, said photo sensor is located on the periphery of the touch screen.

According to the static eliminating method for a touch screen provided by the present invention, said photo sensor also can be integrated together with the touch screen.

According to the static eliminating method for a touch screen provided by the present invention, said touch screen is arranged on a smart hand-held device.

According to the static eliminating method for a touch screen provided by the present invention, the switching method using said photo sensor comprises the following steps:

101) detecting if the touch screen departs from an object by using said photo sensor, if so, entering the next step; otherwise, returning to step 101);

102) counting the number of failures of communication between the touch screen and the control chip, judging if the number of failure is smaller than a communication failure set value, if so, entering the next step; otherwise, entering step 104);

103) executing the reset operation of turning off and then turning on the touch screen, then returning to step 101);

104) judging if a touch event occurs on the touch screen or in an area of the touch screen weak in resistance to static impact, if so, entering the next step; otherwise, returning to step 101);

105) in a set time, detecting if the total number of touch events occurring in the same area exceeds a false report set value, if so, entering the next step; otherwise, returning to step 101); and, 106) resetting the register software of the touch screen, and then returning to step 101).

According to the static eliminating method for a touch screen provided by the present invention, said step 101) comprises detecting if the value of the photo sensor increases from a value approaching to zero to a set threshold value.

According to the static eliminating method for a touch screen provided by the present invention, the communication between the touch screen and the control chip in said step 102) is I2C (Inter-Integrated Circuit) bus communication.

In addition, according to the static eliminating method for a touch screen provided by the present invention, said touch screen and said gravity sensor are respectively arranged on the surface of and inside the hand-held device.

According to the static eliminating method for a touch screen provided by the present invention, the switching method using said gravity sensor matched with the touch screen comprises:

401) detecting if the touch screen of the hand-held device is switched from the state of facing down into the state of facing up by using said gravity sensor, if so, entering the next step; otherwise, returning to step 401);

402) counting the number of failures of communication between the touch screen and the control chip, judging if the number of failures is smaller than a communication failure set value, if so, entering step 404); otherwise, entering the next step;

403) executing the reset operation of turning off and then turning on the touch screen, then returning to step 401);

404) judging if a touch event occurs on the touch screen or in an area of the touch screen weak in resistance to static impact, if so, entering the next step; otherwise, returning to step 401);

405) in a set time, detecting the total number of touch events occurring in the same area exceeds a false report set value, if so, entering the next step; otherwise, returning to step 401); and 406) resetting the register software of the touch screen, and then returning to step 401).

According to the static eliminating method for a touch screen provided by the present invention, said step 401) comprises detecting if the z-axis value of the gravity sensor increases from a value smaller than "−8" to a value bigger than "+8".

According to the static eliminating method for a touch screen provided by the present invention, the communication between the touch screen and the control chip in said step 402) is I2C (Inter-Integrated Circuit) bus communication.

According to the static eliminating method for a touch screen provided by the present invention, said communication failure set value refers to the number of whole communication failure of the I2C bus (it is very possible that other I2C equipment is mounted), specifically, 4-6 times.

According to the static eliminating method for a touch screen provided by the present invention, said set time is 1 second, and said false report set value is 60-80 times.

The static eliminating method for a touch screen provided by the present invention is used for quickly resetting the touch screen to recover normal service if the touch screen is affected by static and has the following advantages in comparison with the prior art:

1. Accurately judge the time when the touch screen fails due to the static.
2. Effectively control the measures for resetting the touch screen after the static failure occurs.
3. Avoid malfunctions.

BRIEF DESCRIPTION OF THE DRAWINGS

The present invention is further described in detail with the reference to drawings and embodiments in combination.

DETAILED DESCRIPTION OF THE INVENTION

Embodiment 1

Firstly, explain the concept and key steps of this embodiment of the present invention:

(1) Detect if the value of the photo sensor increases from a value approaching zero to a bigger value, namely detecting if the touch screen departs from the surface of a certain object.

(2) Count the number of I2C communication failure of the touch screen, judge if the number of failures is smaller than a communication failure set value, if the number of times is higher than the communication failure set value, which means that the touch screen fails in I2C communication for many times, turn off and then turn on the touch screen.

(3) In a set time, detect the number of touch events occurring in a certain area exceeds a false report set value, if the times exceeds false report set value, which means that the infinite touch event occurs in this area of the touch screen, rest the register software of the touch screen.

Figure 1:
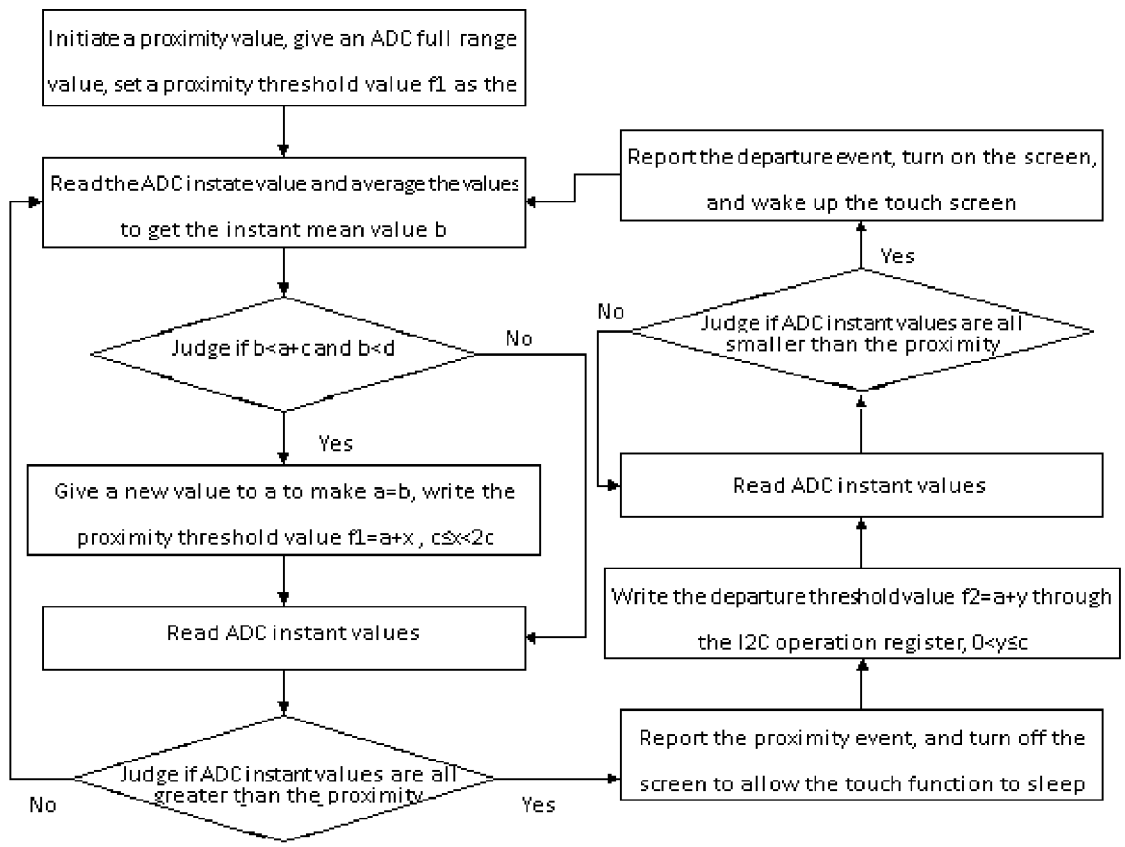
FIG. 1 is a software flow chart of a static eliminating program on a touch screen smart mobile phone in embodiment 1 of the present invention.

Secondly, describe this embodiment in detail:

As shown in FIG. 1, the static eliminating program on a touch screen smart mobile phone in this embodiment of the present invention specifically comprises the following steps:

101) detecting if the touch screen departs from an object by using said photo sensor (namely, detecting if the value of the photo sensor increases from a value approaching to zero to a bigger value), if so, entering the next step; otherwise, returning to step 101);

102) counting the number of failures of the I2C communication between the touch screen and the control chip, judging if the number of failures is smaller than a communication failure set value, if so, entering the next step; otherwise, entering step 104);

103) executing the reset operation of turning off and then turning on the touch screen, then returning to step 101);

104) judging if a touch event occurs on the touch screen or in an area of the touch screen weak in resistance to static impact, if so, entering the next step; otherwise, returning to step 101);

105) in a set time, detecting the total number of touch events occurring in the same area exceeds a false report set value, if so, entering the next step; otherwise, returning to step 101); and, 106) resetting the register software of the touch screen, and then returning to step 101).

Wherein:

In step 101), the variation amount of the value detected by said photo sensor shall be obtained by testing for several times, specifically a numerical value about 5;

In step 102), the communication failure set value for counting of said I2C communication shall be obtained by static testing for several times, specifically a numerical value about 5.

In step 104), said touch events usually occur in the area of the touch screen software weak in resistance to static impact;

In step 105), when the value obtained by dividing the said false report set value by the set time is smaller than the number of the normal touch events on the touch screen, the number of reporting of the touch events every second specifically may be a numerical value about 70.

The working principle of the above embodiment of the present invention is as follows: in the process of unlocking after waking up the mobile phone, accurately judge the static failure occurring at any time on the touch screen, and effectively control the resetting measures after static failure of the touch screen. The present invention mainly comprises steps:

1) detecting if the value of the photo sensor increases from a value approaching to zero to a bigger value, namely detecting if the touch screen departs from the surface of a certain object.

2) count the number of I2C communication failures of the touch screen, judge if the number of failures is lower than the communication failure set value;

3) if the number of failures is higher than the communication failure set value, which means that the touch screen is interfered by static, fails in I2C communication and cannot respond to the normal finger touch, power off the touch screen and reset it;

4) within a set time, detecting if the number of touch events occurring in certain areas exceeds the false report set value;

5) if so, which means that the touch screen is interfered by static, reports the touch information infinitely and cannot respond to normal finger touch, resetting the register software on the touch screen;

6) after the reset operation, returning to the touch screen to test the touch reaction, meanwhile detecting conditions of step 1), if the conditions are met, re-executing steps 1)-5).

Embodiment 2

Firstly, explain the concept and key steps of this embodiment of the present invention:

(1) detecting if the z-axis value of the gravity sensor increases from a value approaching to −9.8 to a value approaching to +9.8 for judging if the touch screen is switched from the state of facing down to the state of facing up. Tests made by the applicant prove that it is easy to generate static in such condition and automatically eliminating static at this time can reduce load on CPU to the largest extent.

(2) Count the number of I2C communication failure of the touch screen, judge if the number of failure are smaller than a communication failure set value, if the times are higher than the communication failure set value, which means that the touch screen fails in I2C communication for many times, turn off and then turn on the touch screen.

(3) In a set time, detect the number of touch events occurring in a certain area exceeds a false report set value, if the times exceeds false report set value, which means that the infinite touch event occurs in this area of the touch screen, rest the register software of the touch screen.

Figure 2:
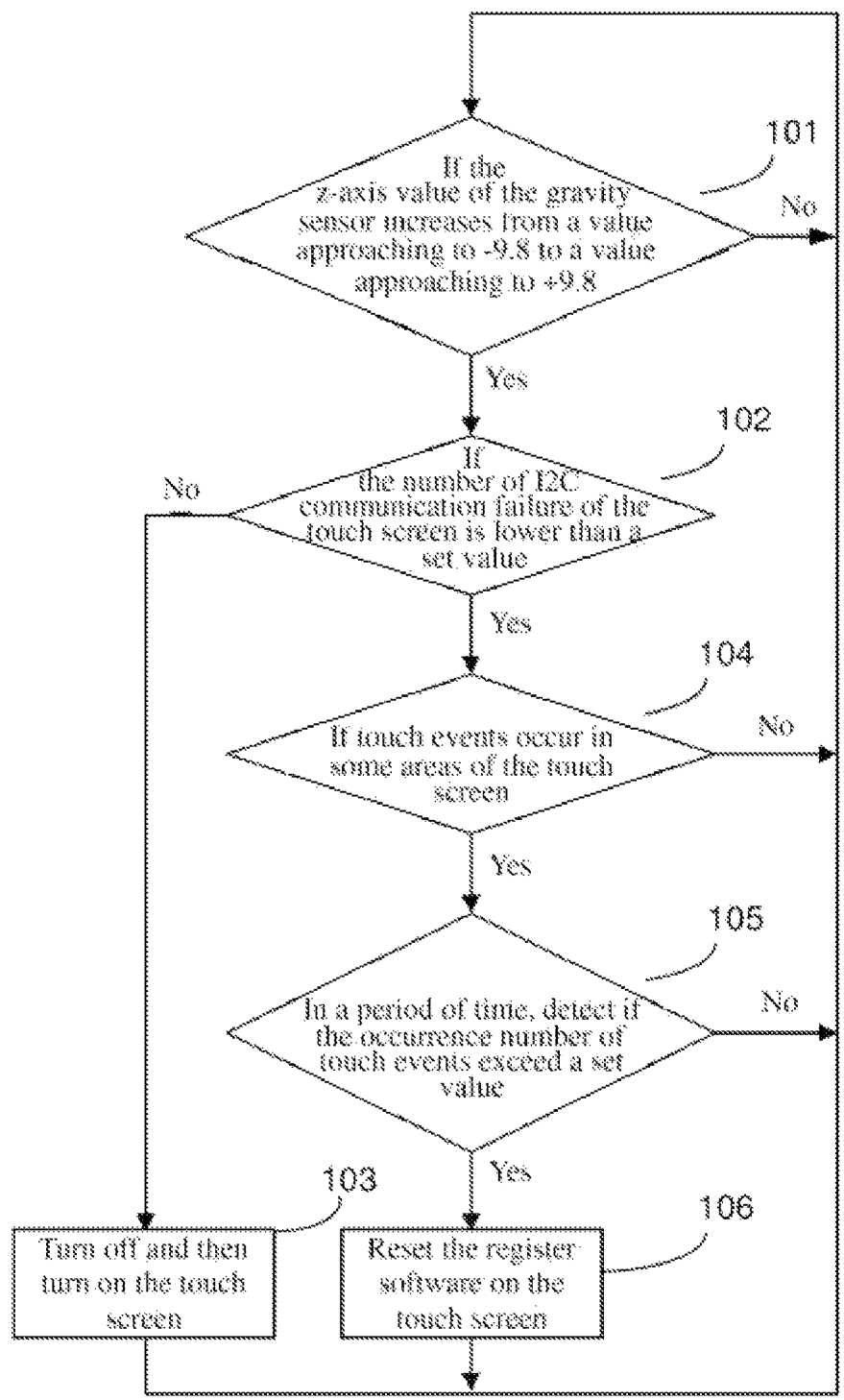
FIG. 2 is a software flow chart of a static eliminating program on a touch screen smart mobile phone in embodiment 2 of the present invention.

Secondly, describe this embodiment in detail:

As shown in FIG. 2, the static eliminating program on a touch screen smart mobile phone in this embodiment of the present invention specifically comprises the following steps:

101) detecting if the touch screen of a hand-held device is switched from the state of facing down to the state of facing up by using a gravity sensor (namely, detecting if the z-axis value of the gravity sensor increases from a value approaching to −9.8 to a value approaching to +9.8), if so, entering the next step; otherwise, returning to step 101);

102) counting the number of failure of the I2C communication between the touch screen and the control chip, judging if the number of failure is lower than a communication failure set value, if so, entering the next step; otherwise, entering step 104);

103) executing the reset operation of turning off and then turning on the touch screen, then returning to step 101);

104) judging if a touch event occurs on the touch screen or in an area of the touch screen weak in resistance to static impact, if so, entering the next step; otherwise, returning to step 101);

105) in a set time, detecting the total number of touch events occurring in the same area exceeds a false report set value, if so, entering the next step; otherwise, returning to step 101); and, 106) resetting the register software of the touch screen, and then returning to step 101).

Wherein:

In step 102), the communication failure set value for counting of said I2C communication shall be obtained by static testing for several times, specifically a numerical value about 5.

In step 104), said touch events usually occur in the area of the touch screen software weak in resistance to static impact.

In step 105), when the value obtained by dividing said false report set value by the set time is smaller than the number of the normal touch events on the touch screen, the number of reporting the touch events every second specifically may be a numerical value about 70.

All in all, the above embodiments are only preferable embodiments of the present invention, and all equivalent changes and modifications made on the concept of the present invention shall belong to the protective scope of the present invention.

What is claimed is:

1. A static eliminating method for a touch screen, characterized by using a photo sensor or using a gravity sensor matched with the touch screen, comprising the following steps in turn:

A, detecting if the touch screen departs from an object by using said photo sensor, and counting a number of communication failures between the touch screen and a control chip, or detecting if the touch screen of a hand-held device is switched from a state of facing down into a state of facing up by using the gravity sensor, counting the number of communication failures between the touch screen and the control chip;

B, executing a reset operation of turning off and then turning on if the number of communication failures exceeds a communication failure set value; or executing the reset operation of resetting a register software of the touch screen/turning off and then turning on touch screen if the number of communication failures is smaller than the communication failure set value and a number of touch events in the same area of the touch screen in a set time exceeds a false report set value;

the static eliminating method for a touch screen using the photo sensor comprises:

101) detecting if the touch screen departs from the object by using said photo sensor, if so, entering the next step; otherwise, returning to step 101);

102) counting the number of communication failures between the touch screen and the control chip, judging if the number of communication failures is smaller than the communication failure set value, if so, entering step 104); otherwise, entering the next step;

103) executing the reset operation of turning off and then turning on the touch screen, then returning to step 101);

104) judging if a touch event occurs on the touch screen, if so, entering the next step; otherwise, returning to step 101);

105) in a set time, detecting if the total number of touch events occurring in the same area exceeds the false report set value, if so, entering the next step; otherwise, returning to step 101); and 106) resetting the register software of the touch screen, then returning to step 101).

2. The static eliminating method for a touch screen according to claim 1, characterized in that, said photo sensor is located on the periphery of the touch screen or below the touch screen.

3. The static eliminating method for a touch screen according to claim 1, said touch screen is arranged on a smart hand-held device.

4. The static eliminating method for a touch screen according to claim 1, characterized in that, said step 101) comprises detecting if the value of the photo sensor increases from a value approaching to zero to a set threshold value.

5. The static eliminating method for a touch screen according to claim 4, characterized in that, the communication between the touch screen and the control chip in step 102) is I2C bus communication.

6. The static eliminating method for a touch screen according to claim 1, characterized in that, said touch screen and said gravity sensor are respectively arranged on a surface of and inside the hand-held device.

7. The static eliminating method for a touch screen according to claim 1, characterized in that, the static eliminating method for a touch screen using the gravity sensor matched with the touch screen comprises:

401) detecting if the touch screen of the hand-held device is switched from the state of facing down into the state of facing up by using said gravity sensor, if so, entering the next step; otherwise, returning to step 401);

402) counting the number of communication failures between the touch screen and the control chip, judging if the number of communication failures is smaller than the communication failure set value, if so, entering step 404); otherwise, entering the next step;

403) executing the reset operation of turning off and then turning on the touch screen, then returning to step 401);

404) judging if a touch event occurs on the touch screen, if so, entering the next step; otherwise, returning to step 401);

405) in a set time, detecting the total number of touch events occurring in the same area exceeds the false report set value, if so, entering the next step; otherwise, returning to step 401); and, 406) resetting the register software of the touch screen, then returning to step 401).

8. The static eliminating method for a touch screen according to claim 7, characterized in that, said step 401) comprises detecting if a z-axis value of the gravity sensor increases from a value smaller than "−8" to a value bigger than "+8".

9. The static eliminating method for a touch screen according to claim 7, characterized in that, the communication between the touch screen and the control chip in step 402) is I2C bus communication.

10. The static eliminating method for a touch screen according to claim 1, characterized in that, said communication failure set value is 4-6 times.

11. The static eliminating method for a touch screen according to claim 1, characterized in that, said false report set value is 60-80 times.

\* \* \* \* \*